3,129,529
PROCESS OF TREATING TREES
Joseph F. Rumsey, Jr., 1708 W. Main St., Oklahoma City, Okla., and Floyd Trimble, Oklahoma City, Okla. (3324 Homewood Drive, Memphis 8, Tenn.)
No Drawing. Filed Apr. 3, 1961, Ser. No. 99,993
4 Claims. (Cl. 47—2)

This invention relates in general to a method of regulating the growth of plants and more particularly it relates to a method whereby the time at which blossoms form on fruit trees may be controlled.

It is well known that the yield of fruit can be severely curtailed by frost or other freezing conditions. This damage results most often when a frost or freeze occurs while the fruit trees are in bloom. As a rule this damage is not the result of a late frost or freeze but is the result of abnormally warm temperatures early in the season which causes blossoms to appear at an early date. It then follows that when temperatures return to normal the blossoms are subject to frost damage. Under such conditions, particularly if the temperature is low enough, the yield of fruit will be practically nil.

Various methods have heretofore been proposed to protect a tree in bloom from frost damage, none of which to the best of our knowledge has been entirely satisfactory. In one proposed method the individual trees have been covered with a sheet of plastic, cloth or even paper. This method while more or less effective is impractical except for covering a few small trees. If an attempt is made to cover a large number of full size fruit trees the method becomes prohibitive because of the costs involved. When it is necessary to protect a large orchard from frost damage the usual practice is to employ smudge pots, whereby the entire orchard may be covered with a blanket of smoke. There are a number of disadvantages to this method. Firstly, it can not be used successfully if the weather conditions are windy. Secondly, the use of smoke is objectionable because it will lay down a layer of soot over the entire country side. An objection that is common to both of the foregoing proposed methods is that a fruit tree when in full bloom will not be protected from frost damage if the temperature drops low enough.

It is, therefore, a principal object of this invention to provide a method of protecting plants particularly fruit trees from frost damage which obviates the disadvantages of the prior art methods.

It is another object of our invention to provide a method whereby fruit trees may be protected from frost damage, which method is economical.

It is another object of the present invention to provide a method whereby fruit trees may be protected from frost damage, which method is simple and easy to use.

It is another object of this invention to provide a method whereby fruit trees may be protected from frost damage, which method is highly efficient.

Other objects and advantages of our invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In brief, the objects and advantages of our invention are accomplished by coating the tree while it is dormant with an insulating material. After all danger of frost has passed the coating of insulating material may be removed from the tree after which the blossoms and leaves will form in their usual manner.

Alternately, the tree may be coated with a wax which forms a more or less impervious coating on the tree thus inhibiting the formation of buds, blossoms and leaves. For best results, using this alternative method, a wax having a melting range is so selected that it will melt and run off the tree when the desired temperatures are reached.

Before proceeding with specific examples illustrating our invention, it may be well to indicate in general the nature of the materials and conditions required in our invention.

Suitable insulating materials include such products as wood flour, asbestos fibers, carbon black, talc, chalk, lime and the like. All of the foregoing materials must be finely divided to permit application by spraying. After the tree has been coated with any one of the foregoing materials the insulating properties may be enhanced greatly by a second coating of a light reflective metal such as aluminum. The metal in the form of powder or fine flakes is applied as a spray.

Suitable waxes are generally petroleum waxes and they should have a melting point within the range of 70 to 120° F. Preferably the melting point of the wax should vary over the range of 80 to 95° F.

When it is desired to use one of the insulating materials, as listed under the first mentioned method of attaining the objects and advantages of the invention, it may be advisable to employ a small amount of a surface active agent in the admixture. Suitable surface active agents include anionic, non-ionic and cationic agents. These chemicals facilitate the wetting of the surface of tree branches to which they are applied, and they aid in dispersing the insulating materials in water.

Suitable surface active agents that may be used in the present invention are listed in U.S. Patent 2,614,917 dated October 21, 1952, which disclosure is hereby made a part of this application.

In addition to the surface active agents listed above any of the alkyl aryl sulfonates listed in U.S. Patent 2,689,173 dated September 14, 1954, may be used.

A convenient method of coating a tree with one of the insulating materials is to mix the powdered substance together with a small amount of a surface active agent with water and then use the resultant slurry to spray onto the tree. As pointed out above this should be done while the tree is in a dormant condition. As to the amount of the insulating material to be admixed with water that may vary widely. To reduce costs of operations we generally use as much as will produce a slurry that can be readily sprayed with the equipment used. Suitable quantities of the surface active agent vary from 0.5 to 5 weight percent based on the weight of insulating material used.

When a petroleum wax is used as a coating medium for the tree best results are obtained when the wax is dissolved in a suitable organic solvent, the resulting solution admixed with water to form an emulsion which is then used as a spray. Suitable organic solvents are those that will dissolve the waxes used of which the lighter petroleum hydrocarbons such as hydrocarbons in the kerosene range as well as $C_5$ to $C_9$ aliphatic alcohols are examples. In the preferred embodiment of this aspect of the invention a suitable emulsifying agent should be incorporated into the mixture. Suitable emulsifiers are those which have the property of rendering oil readily emulsifiable with water. Such emulsifiers are listed in any standard text on this subject. As for example, reference is made to the series of papers by John W. McCutcheon which appeared in the December 1957, January, February, March and April 1958 issues of Soap and Chemical Specialties. As to the amount of emulsifier used that may vary from about 1 to 10 weight percent based on the amount of organic solvent present.

In order to disclose the nature of the present invention still more clearly, the following illustrative examples will be given. It is to be understood that the invention is not to be limited to the specific conditions or details set forth in the examples except insofar as such limitations are specified in the appended claims.

*Example 1*

Five fruit trees, including 2 peach trees, 2 apple trees and a plum tree were sprayed while in the dormant state with a slurry consisting of asbestos fibers in water to which 5 weight percent of sodium dodecylbenzene sulfonate based on the weight of the asbestos was added. After the trees were thoroughly coated with the asbestos a coating of aluminum powder was then applied also by spraying a slurry of aluminum powder in water. After all danger of frost had passed the coatings were removed by directing a stream of water from a hose onto the trees. Blossoms and leaves then formed on the trees in the normal manner. The yield of fruit from each of the trees so treated was excellent. Blossoms on 4 trees not so treated formed early in the season due to a warm period which temperature was considerably above normal. This warm period was followed by lower temperatures and frost which caused considerable damage to these trees. The trees so damaged produced no fruit.

*Example 2*

In this example the procedure of Example 1 was followed except that the other insulating materials listed above were substituted for the asbestos used in Example 1. The results obtained were similar to those obtained with asbestos.

*Example 3*

In this example the procedure of Example 1 was followed except that the asbestos coating was not covered with the aluminum powder. Excellent yields of fruit were obtained from each tree so treated.

*Example 4*

In this example, four fruit trees were sprayed while in the dormant state with an emulsion consisting of a petroleum wax melting range 80 to 85° F. dissolved in odorless kerosene and then admixed with water together with 5 weight percent of sodium dodecylbenzene sulfonate based on the kerosene. More specifically the emulsion consisted of 95 weight percent water and of the remaining 5 weight percent 4 weight percent was kerosene and 0.8 weight percent wax. No blossoms appeared on the trees until after the temperature reached 85° F. When the air temperature reached that value all of the wax coating had disappeared and the trees formed blossoms and leaves in the usual manner. Each tree so treated produced an excellent yield of fruit as no frost occurred after the temperature once reached 85° F.

The foregoing examples demonstrate that we have provided an efficient method of protecting fruit trees from frost damage. This is accomplished, as will be apparent from the examples above, by preventing the formation of blossoms until there is no longer any danger of frost occurring. In addition to being efficient our process is economical also as all the materials used may be obtained at an economical price. The necessity of spraying fruit trees with a dormant spray prior to the formation of blossoms is well recognized. We have found that the materials used in the process of our invention for coating the tree can be readily admixed with the dormant spray thus making it possible to apply the dormant spray and the coating in one operation. This, of course, reduces the costs of the process. We have also found that the presence of the coating material does not have any detrimental effect upon the dormant spray.

While we have described our process as being particularly useful in treating fruit trees it will, of course, be apparent to those skilled in the art as being also valuable in treating plants in general to protect the same from frost damage.

Furthermore, while particular embodiments of the invention have been described, it will be understood, of course, that the invention is not limited thereto since many modifications may be made, and it is therefore, contemplated to cover by the appended claims any such modifications as fall within the true spirit and scope of the invention.

The invention having thus been described, what is claimed and desired to be secured by Letters Patent is:

1. A method of treating a plant to protect the same from frost damage which comprises coating said plant with an emulsion of wax dissolved in an organic solvent selected from the group consisting of petroleum hydrocarbons having a boiling range in the kerosene range and aliphatic alcohols containing from 5 to 9 carbon atoms, water, and a surface active agent, wherein the surface active agent varies from 1.0 to 10.0 percent based upon the amount of organic solvent present, characterized further in that the wax has a melting point varying from 70 to 120° F.

2. A method of treating a plant to protect the same from frost damage which comprises coating said plant with an emulsion of wax dissolved in an organic solvent selected from the group consisting of petroleum hydrocarbons having a boiling range in the kerosene range and aliphatic alcohols containing from 5 to 9 carbon atoms, water and a surface active agent, wherein the surface active agent varies from 1 to 10 percent based upon the amount of organic solvent present characterized further in that the wax has a melting point varying from 80 to 95° F.

3. A method of regulating the growth of a plant which comprises coating said plant while the same is in a dormant state with an emulsion of wax dissolved in an organic solvent selected from the group consisting of petroleum hydrocarbons having a boiling range in the kerosene range and aliphatic alcohols containing from 5 to 9 carbon atoms, water and a surface active agent, wherein the surface active agent varies from 1 to 10 percent based upon the amount of organic solvent present characterized further in that the wax has a melting point varying from 70 to 120° F.

4. A method of regulating the growth of a plant which comprises coating said plant while the same is in a dormant state with an emulsion of wax dissolved in an organic solvent selected from the group consisting of petroleum hydrocarbons having a boiling range in the kerosene range and aliphatic alcohols containing from 5 to 9 carbon atoms, water and a surface active agent, wherein the surface active agent varies from 1 to 10 percent based upon the amount of organic solvent present characterized further in that the wax has a melting point varying from 80 to 95° F.

References Cited in the file of this patent

UNITED STATES PATENTS

| | | |
|---|---|---|
| 1,425,257 | Hockridge | Aug. 8, 1922 |
| 1,995,853 | Hunsaker | Mar. 26, 1935 |
| 2,013,063 | Miller | Sept. 3, 1935 |
| 2,057,413 | Bridgeman | Oct. 13, 1936 |
| 2,185,663 | Greenstreet | Jan. 2, 1940 |
| 2,203,274 | Anderson | June 4, 1940 |
| 2,314,928 | Fischer | Mar. 30, 1943 |
| 2,341,867 | Hitchcock | Feb. 15, 1944 |
| 2,364,054 | Avery | Dec. 5, 1944 |
| 2,394,915 | Jones | Feb. 12, 1946 |

FOREIGN PATENTS

| | | |
|---|---|---|
| 212,628 | Austria | Dec. 27, 1960 |

(Other references on following page)

FOREIGN PATENTS 541,591    Germany  ---------------- Jan. 14, 1932
809,708    Great Britain ------------ Mar. 4, 1959

OTHER REFERENCES

Herbert, F. B.: Spray Stimulation. In Journal of Economic Entomology, vol. 17, pp. 567–572. October 1924.

DeOng, E. R.: Petroleum Oil as a Carrier for Insecticides and as a Plant Stimulant. In Industrial and Engineering Chemistry. 20(8), pp. 826 and 827, August 1928.

Hackh's Chemical Dictionary, Third Edition, published by Blakiston (Phila.), 1944, pages 178, 615, 847, 911.

Belgium, Recueil Des Brevets d'Invention, 1959 Primiere Livraison, published Jan. 31, 1960, page 3, Class A–01–g, advertisement of Belgian Patent 575,296 to Societe-Rhone-Poulenc.